(12) United States Patent
Fehn et al.

(10) Patent No.: US 7,338,996 B2
(45) Date of Patent: Mar. 4, 2008

(54) PRIMER FOR SILICONE RUBBER

(75) Inventors: Armin Fehn, Mehring (DE); Arvid Kuhn, Muehldorf (DE)

(73) Assignee: Wacker Chemie AG, Munich (DE)

( * ) Notice: Subject to any disclaimer, the term of this patent is extended or adjusted under 35 U.S.C. 154(b) by 451 days.

(21) Appl. No.: 10/873,369

(22) Filed: Jun. 21, 2004

(65) Prior Publication Data
US 2004/0266923 A1  Dec. 30, 2004

(30) Foreign Application Priority Data
Jun. 26, 2003  (DE)  ............................. 103 28 843

(51) Int. Cl.
C08J 183/00  (2006.01)
(52) U.S. Cl. .................. 524/261; 528/17; 525/478
(58) Field of Classification Search ............... 524/492, 524/493, 261; 525/478; 528/17
See application file for complete search history.

(56) References Cited

U.S. PATENT DOCUMENTS

| 3,769,253 | A  |   | 10/1973 | Stevenson |         |
|-----------|----|---|---------|-----------|---------|
| 4,287,114 | A  | * | 9/1981  | Itoh et al. | 524/493 |
| 5,008,349 | A  | * | 4/1991  | Kosal et al. | 525/477 |
| 5,248,715 | A  | * | 9/1993  | Gray et al. | 524/265 |
| 6,409,874 | B1 | * | 6/2002  | Van Der Aar et al. | 156/314 |
| 6,576,082 | B2 | * | 6/2003  | Okamoto et al. | 156/329 |
| 6,773,758 | B2 | * | 8/2004  | Yamanaka | 427/407.1 |
| 2006/0207723 | A1 | * | 9/2006 | Kuhn et al. | 156/329 |
| 2007/0043196 | A1 | * | 2/2007 | Teysseire | 528/38 |

FOREIGN PATENT DOCUMENTS

EP  0 061 871       10/1984
EP  0 446 830 A2   9/1991

* cited by examiner

Primary Examiner—Katarzyna Wyrozebski
(74) Attorney, Agent, or Firm—Brooks Kushman P.C.

(57) ABSTRACT

Primer compositions comprising
(A) organopolysiloxanes having at least four ethylenically unsaturated radicals $R^1$ per molecule,
(B) organosilane or organocarbosilane compounds having at least one hydrolyzable group selected from $-OR^2$, $-NR^2_2$, $R^2-C(=O)-N(R^2)-$ or $-O-N=CR^2_2$, where $R^2$ is an optionally substituted alkyl group,
(C) fillers, such as reinforcing fillers, silicone resins or hydrolysis condensates of at least one organosilicon compound (B) defined above, and
(D) solvents, such as organic solvents of low molecular weight cyclic or linear polyorganosilicon compounds, provide high adhesive strength between a variety of substrates and silicone rubber compositions, such that composites of improved properties may be produced.

20 Claims, No Drawings

PRIMER FOR SILICONE RUBBER

BACKGROUND OF THE INVENTION

1. Field of the Invention

The invention relates to primer compositions and their preparation, to a process for improving the adhesion of silicone rubber to a substrate, in particular for adhesive bonding of silicone rubber with a substrate, to shaped composite articles and composite materials resulting therefrom, and to their use.

2. Background Art

U.S. Pat. No. 3,769,253 describes primer compositions which contain polydiorganosiloxanes having vinyl groups, organic peroxides, and silanes having acyloxy groups. A major disadvantage of such primers is their non-optimal adhesion to metals. These primer coats have the further disadvantage that, owing to carboxylic acids liberated from the acyloxy groups, both the stability of the silicone elastomer is reduced, and corrosion of the substrate, particularly metal substrates, is promoted.

EP-A 61 871 discloses primer compositions which contain an alkoxy-containing silicon compound, optionally partial hydrolysis condensates thereof, an organic solvent, and a hydroperoxide. If the hydroperoxide is replaced by dialkyl peroxides or diaryl peroxides, poorer adhesion is achieved.

U.S. Pat. No. 6,409,874 describes a process for the preparation of a silicone-metal adhesive bond. Here, the metal substrate or the silicone elastomer substrate is first brought into contact with a mixture of a nonfunctional silane and a functional silane having alkoxy groups, the silanes being partly hydrolyzed, and the two substrates are then combined.

SUMMARY OF THE INVENTION

It is an object of the invention to overcome the disadvantages of the prior art and to improve the adhesion of silicone rubber to various substrates, in particular to metals. These and other objects are achieved by the invention, wherein primer compositions are employed which contain multiply ethylenically unsaturated organopolysiloxanes and silanes or carbosilanes containing hydrolyzable groups.

DETAILED DESCRIPTION OF THE PREFERRED EMBODIMENT(S)

The invention thus relates to primer compositions comprising (A) 100 parts by weight of organopolysiloxanes comprising units of the general formula

$$R_a R^1_b SiO_{(4-a-b)/2} \quad (I)$$

in which

R is a hydroxyl radical or a monovalent $C_{1-20}$ hydrocarbon radical which is optionally halogen-substituted or contains O, N, S or P atoms, and is free of aliphatically unsaturated groups, $R^1$ is a monovalent, aliphatically unsaturated $C_{1-10}$ hydrocarbon radical which is optionally halogen-substituted or contains O or N atoms, a is 0, 1, 2 or 3 and b is 0, 1, 2 or 3, with the proviso that the sum (a+b) is $\leq 3$ and that at least four radicals $R^1$ are present on average per molecule, (B) from 5 to 500 parts by weight of organosilicon compounds having at least one hydrolyzable group, selected from among the formulae

$$R^2_c R^3_d Si(X)_e \quad \text{(II) and}$$

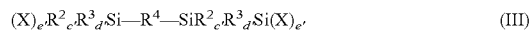
$$(X)_e R^2_c R^3_d Si-R^4-SiR^2_{c'} R^3_{d'} Si(X)_{e'} \quad \text{(III)}$$

in which $R^2$ is an optionally halogen-substituted monovalent $C_{1-20}$ hydrocarbon radical, $R^3$ is a monovalent radical selected from the group consisting of alkenyl radicals and $Y-R^4$ radicals, X is a hydrolyzable group selected from the groups $-OR^2$, $-NR^2_2$, $R^2-C(=O)-N(R^2)-$ and $-O-N=CR^2_2$, Y is a monovalent radical selected from the group consisting of anhydride, aminoalkoxy, acryloyloxy, methacryloyloxy, N-aminoalkylamino, sulfone, sulfonate, phosphate, phosphonate, amino, N-alkylamino, epoxy and mercapto radicals, $R^4$ is a divalent $C_{1-20}$ hydrocarbon radical optionally containing O atoms, c and d are each 0, 1, 2 or 3 and e is 1, 2, 3 or 4, with the proviso that the sum c+d+e=4;

c' and d' are each 0, 1 or 2 and e' is 1, 2 or 3, with the proviso that the sum c'+d'+e'=3, (C) from 5 to 500 parts by weight of fillers selected from the group consisting of the reinforcing fillers and hydrolysis condensates of at least one organosilicon compound (B) defined above, this condensate containing at least two radicals X per molecule, (D) from 10 to 2000 parts by weight of solvent selected from the group consisting of organic solvents and of the low molecular weight cyclic or linear polyorganosilicon compounds, (E) from 0 to 80 parts by weight of peroxidic crosslinking agents preferably selected from the group consisting of the dialkyl peroxides, diaryl peroxides, alkylaryl peroxides, aralkyl peroxides and hydroperoxides, (F) from 0 to 50 parts by weight of condensation catalysts, and (G) from 0 to 50 parts by weight of further substances selected from the group comprising inactive fillers, pigments, dyes, heat stabilizers, alkynols, benzotriazoles, triazoles, fibers and plastics powders.

Preferably, the primer compositions according to the invention contains, as component (A), an aliphatic unsaturated organopolysiloxane compound, it being possible to use all aliphatically unsaturated organopolysiloxane compounds which have been used to date in silicone materials and which have at least four radicals $R^1$, preferably vinyl groups, including as well, for example, silicone block copolymers having urea segments, silicone block copolymers having one or more of amide segments, imide segments, ester-amide segments, polystyrene segments, silarylene segments, carborane segments, and alkylene oxide segments, and silicone graft copolymers having ether groups.

The number average molecular weight $M_n$ of component (A), determined by means of NMR, may vary within wide limits, for example from $10^2$ to $10^6$ g/mol. Thus, the component (A) may be, for example, a relatively low molecular weight alkenyl-functional organosiloxane, such as tetravinylhexamethyltetrasiloxane, but may also be a highly polymeric polydimethylsiloxane having Si-bonded vinyl side groups and optionally terminal Si-bonded vinyl groups, for example having a molecular weight of $10^5$ g/mol.

The structure of the molecules forming the component (A) is also not critical. In particular, they may be relatively high molecular weight, i.e. oligomeric or polymeric siloxanes, and may be linear, cyclic, branched, resin-like, or network-like. Linear and cyclic siloxanes are preferably composed of units of the formula $R_3SiO_{1/2}$, $R^1R_2SiO_{1/2}$, $R_1RSiO_{2/2}$ and $R_2SiO_{2/2}$, in which R and $R^1$ have the abovementioned meaning. Branched and network-like polysiloxanes additionally contain trifunctional and/or tetra functional units, those of the formulae $RSiO_{3/2}$, $R^1SiO_{3/2}$ and $SiO_{4/2}$ being preferred. Mixtures of different siloxanes satisfying the criteria of the component (A) can of course also be used.

For good adhesion, component (A) preferably has more than four Si-bonded vinyl side groups per molecule, more preferably greater than ten Si-bonded vinyl side groups per molecule, and most preferably, more than 20 Si-bonded vinyl side groups per molecule. The terminal groups of the component (A) may additionally have Si-bonded vinyl groups, without this being essential.

Organopolysiloxanes (A) preferably used are substantially linear organopolysiloxanes of the general formula

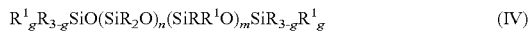

(IV)

in which R and $R^1$ have the meaning mentioned above therefor, g is 0, 1, 2 or 3, m is an integer from 4 to 5000, preferably from 10 to 600, more preferably from 20 to 200, and n is 0 or an integer from 1 to 7000, preferably from 10 to 4000.

The organopolysiloxanes (A) preferably have a viscosity of from 0.001 to 50,000 Pa·s at 25° C., preferably from 0.05 to 20,000 Pa·s at 25° C., and most preferably from 0.1 to 200 Pa·s at 25° C.

Examples of radicals R are alkyl radicals such as the methyl, ethyl, n-propyl, isopropyl, 1-n-butyl, 2-n-butyl, isobutyl, tert-butyl, n-pentyl, isopentyl, neopentyl and tert-pentyl radicals, hexyl radicals such as the n-hexyl radical, heptyl radicals such as the n-heptyl radical, octyl radicals such as the n-octyl radical, and isooctyl radicals such as the 2,2,4-trimethylpentyl radical, nonyl radicals such as n-nonyl radical, decyl radicals such as the n-decyl radical, dodecyl radicals such as the n-dodecyl radical, and octadecyl radicals such as the n-octadecyl radical; cycloalkyl radicals such as cyclopentyl, cyclohexyl, cycloheptyl and methylcyclohexyl radicals; aryl radicals such as the phenyl, naphthyl, anthryl and phenanthryl radicals; alkaryl radicals such as o-, m- and p-tolyl radicals, xylyl radicals and ethylphenyl radicals; and aralkyl radicals, such as the benzyl radical and the α- and the α-phenylethyl radical.

Examples of substituted radicals R are haloalkyl radicals, such as 3,3,3-trifluoro-n-propyl radical, the 2,2,2,2',2',2'-hexafluoroisopropyl radical and the heptafluoroisopropyl radical, and haloaryl radicals, such as the o-, m- and p-chlorophenyl radical, and all radicals mentioned above for R, which preferably may be substituted by mercapto groups, epoxy functional groups, carboxyl groups, keto groups, enamine groups, amino groups, aminoethylamino groups, isocyanato groups, aryloxy groups, acryloyloxy groups, methacryloyloxy groups, hydroxyl groups and halogen groups.

Examples of radicals $R^1$ are alkenyl radicals such as the vinyl, 5-hexenyl, cyclohexenyl, 1-propenyl, allyl, 3-butenyl and 4-pentenyl radicals, and alkynyl radicals such as the ethynyl, propargyl and 1-propynyl radicals. The radical $R^1$ is preferably an alkenyl radical, the vinyl radical being particularly preferred.

Examples of hydrocarbon radicals R and halogen-substituted hydrocarbons R are also applicable for hydrocarbon radicals $R^2$ and halogen-substituted hydrocarbon radicals $R^2$.

Examples of alkenyl radicals $R^1$ are also applicable for alkenyl radicals $R^3$, the vinyl radical being preferred.

Examples of radicals $R^4$ are divalent hydrocarbon radicals, such as methylene, ethylene, propylene, butylene, phenylene and xylylene radicals, $—CH_2CH(CH_3)—C_6H_4—CH(CH_3)CH_2—$, $—CH_2CH_2—C_6H_4—CH_2CH_2—$, and substituted radicals such as hydroxyhydrocarbon radicals and ether radicals, for example $—CH_2O(CH_2)_3—$, $—CH_2CH_2—O—CH_2CH_2—$, $—CH_2CH_2—O—CH(CH_3)CH_2—$, $—CH_2—O—CH_2CH_2—O—CH_2—$, $—CH_2CH_2CH_2—O—CH_2CH_2CH_2—$ and $—CH_2CH_2CH_2—OC(=O)O—CH_2CH_2CH_2—$.

Examples of organosilicon compounds (B) of the formula (II) are alkoxysilanes, such as vinyltrimethoxysilane, vinyltriethoxysilane, methylvinyldimethoxysilane, dimethylvinylmethoxysilane, vinyltris(methoxypropoxy)silane, vinyltris(2-methoxyethoxy)silane, 3-(methacryloyloxy)propyltrimethoxysilane, 3-(methacryloyloxy)-methyltrimethoxysilane, 3-(methacryloyloxy)methyltriethoxysilane, 3-(methacryloyloxy)propyltriethoxysilane, 3-(methacryloyloxy)-propylmethyldimethoxysilane, 3-(methacryloyloxy)propyldimethylmethoxysilane, 3-(acryloyloxy)propyltriethoxysilane, allyltrimethoxysilane, allyltriethoxysilane, allylmethyldiethoxysilane, mercaptopropyltrimethoxysilanes, mercaptopropylmethyldimethoxysilanes, 3-(2-aminoethylamino)propyl-trimethoxysilane, 3-(2-aminoethylamino)propylmethyldimethoxysilane, 3-cyclohexylaminopropyltrimethoxysilane, 3-aminopropyltriethoxysilane, mercaptopropyltrimethoxysilane, 3-mercaptopropylmethyldiethoxysilane, 3-(glycidyloxy)propyltrimethoxysilane, 3-(glycidyloxy)propylmethyldimethoxysilane, 2-(3,4-epoxycyclohexyl)ethyltrirnethoxysilane, 3-isocyanatopropyltrimethoxysilane, 3-isocyanatopropylmethyldimethoxysilane, 3-isocyanatopropyltriethoxysilane, 3-isocyanatopropylmethyldiethoxysilane, (isocyanatomethyl)trimethoxysilane, (isocyanatomethyl)methyldimethoxysilane, (isocyanatomethyl)triethoxysilane, (isocyanatomethyl)methyldiethoxysilane, (aminomethyl)trimethoxysilane, (aminomethyl)methyldimethoxysilane, (anilinomethyl)trimethoxysilane, (anilinomethyl)methyldimethoxysilane, (anilinomethyl)triethoxysilane, (hexylaminomethyl)trimethoxysilane, (hexylaminomethyl)methyltrimethoxysilane, 3-(triethoxysilyl)propylsuccinic anhydride, 3-cyanopropyltrimethoxysilane, tetramethoxysilane, tetraethoxysilane, tetrapropoxysilane, tetrabutoxysilane, chloropropyltrimethoxysilane, chloromethyltrimethoxysilane, chloromethyldimethoxysilane, methyltrimethoxysilane, methyltriethoxysilane, isooctyltrimethoxysilane, and cyclohexylmethyldimethoxysilane.

Further examples are aminosilanes, aldoximosilanes and ketoximosilanes, such as tris(butylamino)vinylsilane and tris(diethylamino)vinylsiloxane.

Examples of organosilicon compounds (B) of the formula (III) are 1,2-bis(methyldiethoxysilyl)ethane, 1,2-bis(trimethoxysilyl)ethane and 1,2-bis(triethoxysilyl)ethane.

The organosilicon compounds (B) are preferably used in amounts of from 15 to 300 parts by weight, based in each case on 100 parts by weight of organopolysiloxanes (A).

Examples of reinforcing fillers which may be used as component (C) in the materials according to the invention are pyrogenic or precipitated silicas having BET surface areas of at least 50 m²/g and carbon blacks and active carbons, such as furnace black and acetylene black, pyrogenic and precipitated silicas having BET surface areas of at least 50 m²/g being preferred.

Silica fillers may have a hydrophilic character or may have been rendered hydrophobic by known methods. When mixing in hydrophilic fillers, the addition of a water repellent is required. If hydrophilic fillers are used, water repellency is imparted expediently, but not necessarily, in a separate step. For this purpose, component (A) and optionally siloxanes of the component (G) are mixed with the hydrophilic filler in the presence of a water repellent by methods known to a person skilled in the art.

Further examples of component (C) are MQ, MT, MDQ, MDT, MTQ and MDTQ silicone resins, in which M are $R_3SiO_{1/2}$ and/or $HR_2SiO_{1/2}$ and/or $R^1R_2SiO_{1/2}$ units, D are $R^1RSiO_{2/2}$ and/or $R_2SiO_{2/2}$ and/or $HRSiO_{2/2}$ units, T are $RSiO_{3/2}$ and/or $R^1SiO_{3/2}$ and/or $HSiO_{3/2}$ units and Q are $SiO_{4/2}$ units, in which R and $R^1$ have the meaning described above, these silicon compounds containing at least two hydrolyzable groups X on average per molecule.

The fillers (C) are preferably used in amounts of from 15 to 60 parts by weight, based in each case on 100 parts by weight of organopolysiloxanes (A).

The components (A) to (C) and, if required, further components are preferably dissolved, partly dissolved, emulsified and/or suspended in component (D). Examples of (D) are organic solvents and/or solvent mixtures of two or more solvents, such as optionally substituted alkanes, for example pentane, heptane, hexane, octane, isooctane, nonane, decane, methylene chloride, trichloroethylene and mixtures thereof; optionally substituted aromatics such as benzene, toluene, xylene, chlorobenzene and mixtures thereof; optionally substituted esters such as ethyl acetate, ketones such as acetone and methyl ethyl ketone, optionally substituted alcohols such as methanol, ethanol, isopropanol, propanol, butanol and ethylhexanol, and optionally substituted ethers such as tetrahydrofuran, diethyl ether, dibutyl ether, tert-butyl methyl ether, dibutyl ether, ethylene glycol dimethyl ether, and mixtures thereof. Solvents (D) are preferably used in amounts of from 100 to 600 parts by weight, based in each case on 100 parts by weight of organopolysiloxanes (A).

In addition to the components (A) to (D), the primer compositions according to the invention also may contain further substances.

The component (E) is preferably added as a further constituent to the components (A) to (D). Component (E) is a peroxidic crosslinking agent, preferably a dialkyl peroxide, diaryl peroxide, alkylaryl peroxide, aralkyl peroxide, hydroperoxide, or like compound. The proportion of component (E) is preferably from 0.5 to 40 parts by weight, based on 100 parts by weight of organopolysiloxanes (A).

Examples of crosslinking agent (E) are bis(2,4-dichlorobenzoyl) peroxide, dicumyl peroxide, dibenzoyl peroxide, di-tert-butyl peroxide, 1,1-di-tert-butyl peroxy-3,3,5-trimethylcyclohexane, 2,5-bis(tert-butylperoxy)-2,5-dimethylhexane, bis(4-methylbenzoyl) peroxide, vinyltris(tert-butylperoxo)silane, cumyl hydroperoxide, tert-butyl hydroperoxide, cyclohexyl hydroperoxide and 2,4,4-trimethylpent-2-yl hydroperoxide.

For the purpose of further improving or of modifying the properties of the primer composition, further components may be added. The primer composition may contain, as component (F), condensation catalysts, for example, metal salts, which catalyze the hydrolysis and/or condensation of the hydrolyzable groups of the component (B). These are preferably chelates of a metal M, metallic alkoxides of the formula $M(OR^5)_n$, and/or metallic carboxylates of the formula $M(O_2CR^5)_n$, in which n is the valency of M, and $R^5$ is preferably selected from the group consisting of the radicals R and $R^1$, as defined above, and M is preferably selected from the group consisting of Ti, Zr, Cu, Ge, Mn, Fe, Al, Mg and Zn. $R^5$ are more preferably linear or branched alkyl or alkylene radicals having 1-8 carbon atoms, and M is more preferably selected from the group consisting of Ti, Zr, Fe, Al and Zn. $R^5$ are most preferably ethyl, propyl, isopropyl, butyl, acryloyl, methacryloyl, ethenyl and methylethenyl radicals, and M is preferably Ti, Al or Zn.

Examples of component (F) are tetrabutyl titanate, tetraisopropyl titanate, diisopropoxy bis(acetylacetonate)titanate, diisopropoxy bis(ethylacetylacetonate)titanate, zirconium tetrabutylate, zirconium tetrabutyrate, zirconium tetrapropylate, zirconium diacetate, zirconium tetra(acetylacetonate), zinc dimethacrylate, tributoxyzirconium acetylacetonate, aluminum tris(acetylacetonate), aluminum triisopropylate and aluminum tris(ethylacetylacetonate). Condensation catalysts (F) are preferably used in amounts of from 0.1 to 10 parts by weight and preferably from 1 to 5 parts by weight, based on 100 parts by weight of organopolysiloxanes (A).

The primer composition according to the invention can optionally contain further substances as component (G). These substances may be inactive fillers, such as quartz powder, diatomaceous earth, clays, chalk or lithopone; dispersants; pigments; dyes; heat stabilizers such as carbon blacks, graphite and metal compounds such as platinum complexes; alkynols; benzotriazoles; triazoles; fibers, such as glass fibers and plastics fibers; and plastics powders. The proportion of component(s) (G) depends to a great extent on the compound used in each case and on the intended use and may used in amounts of from 0 to 50 parts by weight, based in each case on 100 parts by weight of organopolysiloxanes (A).

The components (A) to (G) used according to the invention may each be a single type of such a component or a mixture of at least two different types of such a component. Moreover, the various radicals R, $R^1$, $R^2$, $R^3$, $R^4$, etc., may be the same or different in each component.

The preparation of the primer composition can be effected by known processes, such as, for example, by uniform mixing of the individual components (A), (B), (C), (D) and, if required, (E), (F) and (G). The sequence is arbitrary. Depending on the viscosity of organopolysiloxanes (A), the mixing may be effected, for example, using a stirrer, in a dissolver, on a roll, or in a kneader.

By employing the inventive primer composition, silicone rubbers and silicone elastomers can be adhesively bonded to a very wide range of substrates. The invention therefore relates to a process for improving the adhesion of silicone rubber to a substrate by applying the primer composition to the substrate, allowing the primer composition to dry or to crosslink in order to form a substrate covered with primer, applying a crosslinkable silicone rubber composition to the substrate covered with primer in order to obtain a composite, and curing the composite in order to obtain an adhesive bond between the silicone rubber and the substrate.

Examples of substrates are metals such as iron, aluminum, copper, zinc, stainless steel, brass, bronze and alloys thereof; plastics such as natural rubber, epoxy, polyester and polyamide resins, PVC and PBT; and inorganic materials, such as glass, glass fibers, mortar and asbestos. This list is exemplary only, and not limiting.

All customary peroxide-crosslinking, addition-crosslinking and condensation-crosslinking silicone rubber compositions and fluorosilicone rubber compositions known to date can be used as the crosslinkable silicone rubber composition. These are peroxide-crosslinking and addition-crosslinking (such as platinum-crosslinking) HTV materials, LSR materials and addition-crosslinking and condensation-crosslinking RTV-2 materials, the primer compositions preferably being used with peroxide- and platinum-crosslinking HTV materials, LSR materials and platinum-crosslinking RTV-2 materials, and most preferably with peroxide-crosslinking HTV materials. HTV, LSR and RTV materials are well known to a person skilled in the art.

The adhesive bond is facilitated by preparation methods known in principle to a person skilled in the art. The adhesive bond is preferably produced by cleaning the substrate by known methods (inter alia, sandblasting, blasting, grinding, turning, etching) and/or degreasing of the substrate followed by applying the primer composition to the substrate by any acceptable method, for example, spraying, rolling, brushing, knife-coating or dipping. The primer composition is preferably dried at temperatures of from 0° C. to 150° C., more preferably from 20° C. to 100° C., and most preferably from 20° C. to 50° C., preferably for a time ranging from 1 min to 100 hours. The unvulcanized silicone rubber is then applied to the primed substrate and preferably crosslinked at temperatures of from 80° C. to 250° C., more preferably from 130° C. to 200° C., preferably for a time ranging from 1 second to 10 hours, to give a composite material. Here, all methods known today for applying silicone materials to substrates can be used, such as injection molding, extrusion, press molding, compression molding, transfer molding and pressing generally. The adhesive bond can, if required, then be heated at temperatures above room temperature for some time. The conditions are dependent on the substrate used and on the type of silicone rubber. For metals, the primed substrate is preferably vulcanized with the unvulcanized silicone rubber for from 30 seconds to 20 min, more preferably from 5 to 10 min, at a temperature of from 160° C. to 200° C. under pressure and, if required, further heated for a period of from 2 to 6 hours, more preferably 4 hours, at 200° C. The pressure may vary within wide limits, in particular from ambient pressure to very high pressures. The adhesion can frequently be improved by higher crosslinking temperatures and longer crosslinking times. The primed substrate can be stored for up to 2 months before it is adhesively bonded with the silicone rubber by the method described.

The primer compositions can advantageously be used wherever strong adhesion between a peroxide-crosslinking or addition-crosslinked silicone elastomer and a substrate, preferably one constructed of plastics, metals or glasses, is desired. The substrate may be present in any form, for example in the form of a shaped article, film or coating. The primer composition is suitable for the production of composite material by coating, adhesive bonding or casting and for the production of shaped articles.

The primer compositions are particularly suitable for the potting and for the adhesive bonding of electrical and electronic parts, and for the production of shaped composite articles. Shaped composite articles are understood here as meaning a uniform shaped article comprising a composite material, which is composed of a silicone elastomer part produced from the silicone compositions and at least one substrate so that there is a strong, permanent bond between the two parts. Composite materials and in particular shaped composite articles can be used in a variety of applications, for example in the electronics, household appliances, consumer goods, building and automotive industry, in medical technology, and in the production of sports articles and leisure articles.

The following examples serve for illustrating the invention without limiting it in any way. In the examples, all data on parts and percentages are based on weight, unless stated otherwise. Furthermore, all viscosity data are based on a temperature of 25° C. Unless stated otherwise, the examples below are carried out at a pressure of the ambient atmosphere, i.e. about 1020 hPa, and at room temperature, i.e. at about 20° C., or at a temperature which is established on combining the reactants at room temperature without additional heating or cooling.

EXAMPLE 1

Primer 1

60 parts of a hydrophobic pyrogenic silica having a BET surface area of 300 m$^2$/g and a carbon content of 3.95% by weight, 100 parts of a vinyldimethylsiloxy-terminated polydimethylsiloxane having on average 25 vinyl side groups and a viscosity of 700 mm$^2$/s, 300 parts of [3-trimethoxysilyl]propyl methacrylate and 600 parts of toluene were thoroughly mixed at room temperature for 30 min using a dissolver.

EXAMPLE 2

Primer 2

Primer 2 was prepared by a method analogous to that used to prepare primer 1, except that 10 parts of titanium(IV) butylate were also added prior to stirring.

EXAMPLE 3

Primer 3

Primer 3 was prepared by a method analogous to that used to prepare primer 2, except that 7 parts of dicumyl peroxide were also added prior to stirring.

EXAMPLE 4

Primer 4

75.2 parts of a vinyldimethylsiloxy-terminated polydimethylsiloxane having on average 200 vinyl side groups per molecule and having a Brabender plasticity of 530 Nm, corresponding to an average molar mass (number average) of about 400,000 g/mol, were mixed with 6.2 parts of a polydiorganosiloxane which has hydroxyl groups as terminal groups and whose content of OH groups is 4% by weight, with one part of hexamethylsilazane and with 20.0 parts of a hydrophilic pyrogenic silica having a BET surface area of 300 m$^2$/g (commercially available under the name "HDK® T 30" from Wacker-Chemie GmbH), which was metered in in 6-7 portions over the course of 4 hours in a kneader to give a homogeneous material. 100 parts of vinyltrimethoxysilane, 30 parts of tetraethoxysilane and 400 parts of Isopar E (comprising $C_7$- to $C_{10}$-isoalkanes) were added to 200 parts of the mixture thus obtained, and the resulting composition was mixed at room temperature using a stirrer.

EXAMPLE 5

Primer 5

Primer 5 was prepared by a method analogous to that used to prepare primer 4, except that 5 parts of titanium(IV) butylate were also added prior to stirring.

EXAMPLE 6

Primer 6

Primer 6 was prepared by a method analogous to that used to prepare primer 5, except that 20 parts of bis(2,4-dichlorobenzoyl) peroxide were also added prior to stirring.

EXAMPLE 7

Primer 7

65 parts of a vinyldimethylsiloxy-terminated polydimethylsiloxane having on average 30 vinyl side groups per molecule and having a Brabender plasticity of 530 Nm, corresponding to an average molar mass (number average) of about 400,000 g/mol, were initially introduced, with 4.0 parts of a polydiorganosiloxane which has hydroxyl groups as terminal groups and whose content of OH groups is 4% by weight, into a kneader. Thereafter, 26.0 parts of a hydrophilic pyrogenic silica having a BET surface area of 300 $m^2$/g, commercially available under the name "HDK® T 30" from Wacker-Chemie GmbH, were metered in in 6-7 portions and mixed over the course of 3 hours to give a homogeneous material. Finally, the mixture was kneaded at 150° C. in vacuo for 2 hours in order to remove volatile constituents. 660 parts of this mixture, 100 parts of a vinyldimethylsiloxy-terminated polydimethylsiloxane having on average 35 vinyl side groups and a viscosity of 680 $mm^2$/s, 500 parts of vinyltrimethoxysilane, 50 parts of titanium tetrabutylate, 1000 parts of Isopar E, 1000 parts of xylene, and 70 parts of dicumyl peroxide were homogenized using a stirrer.

COMPARATIVE EXAMPLE C1

Primer 8

100 parts of a vinyldimethylsiloxy-terminated polydimethylsiloxane having on average 25 vinyl side groups and a viscosity of 700 $mm^2$/s, 300 parts of [3-trimethoxysilyl] propyl methacrylate and 600 parts of toluene were thoroughly mixed at room temperature for 30 min using a stirrer.

COMPARATIVE EXAMPLE C2

Primer 9

60 parts of a hydrophobic pyrogenic silica having a BET surface area of 300 $m^2$/g and a carbon content of 3.95% by weight, 100 parts of a vinyldimethylsiloxy-terminated polydimethylsiloxane without vinyl side groups and having a viscosity of 700 $mm^2$/s, 300 parts of [3-trimethoxysilyl] propyl methacrylate and 600 parts of toluene were thoroughly mixed at room temperature for 30 min using a dissolver.

COMPARATIVE EXAMPLE C3

Primer 10

60 parts of a hydrophobic pyrogenic silica having a BET surface area of 300 $m^2$/g and a carbon content of 3.95% by weight, 100 parts of a vinyldimethylsiloxy-terminated polydimethylsiloxane having on average 25 vinyl side groups and a viscosity of 700 $mm^2$/s, and 600 parts of toluene were thoroughly mixed at room temperature for 30 min using a dissolver.

EXAMPLE 8

Characterization of the Adhesion

Small metallic substrate plates (W×L×T=25 mm×60 mm×3 mm) were sand-blasted and then degreased with acetone, and small plastics plates were not sandblasted, but were degreased with acetone, ethanol or toluene. Thereafter, the substrate was coated with the primer to be tested and was brought to comparable coat thickness using a doctor blade. The small plates primed in this manner were stored for one hour in air before they were introduced into a stainless steel compression mold and the mold was filled with a silicone elastomer material. The silicone elastomer material used was ELASTOSIL® R 101/45 available from Wacker Chemie GmbH, which contains 0.7% by weight of dicumyl peroxide. Similar values were obtained using alternative peroxidically crosslinking and addition-crosslinking silicone materials (HTV and LSR materials).

Pressure vulcanization was effected for 15 min at a temperature of 165° C. and a clamping force of 30 metric tonnes (untempered) Finally, the adhesive bonds with metal substrates were heated in a forced-circulation drying oven at 200° C. for 4 hours (tempered). After removal of the adhesive bond, the rigid substrate element was firmly clamped and the maximum separation force required for detaching the adhering silicone elastomer strip was determined in a peel test according to DIN 53531, with the following special features: the thickness of the substrate plate was 3 mm and the thickness of the elastomer above the substrate plate was 5 mm, and is reported in N/mm. 5 adhesive bonds were measured per example, the separation force was determined as a mean value and the fraction of cohesive failure was determined in percent. Cohesive failure of 0% means that the silicone elastomer was completely detached from the substrate surface without leaving a residue. Cohesive failure of 100% means that the delamination took place exclusively through tear growth within the silicone elastomer.

The adhesion of the primer compositions according to the invention and primer compositions not according to the invention was tested on the following substrates:

I. Polybutylene terephthalate (PBT): Ultradur® B4300G6 (BASF AG; 30% of glass fibers)
II. Polyamide 6: Durethan® BKV30 (Bayer AG; 30% of glass fibers)
III. Polyamide 6,6: Ultramid® A3WG6 (BASF AG; 30% of glass fibers)
IV. Aluminum (industrial quality)
V. Steel: V2A stainless steel (industrial quality)
VI. Steel ST 37 (industrial quality)

The results are summarized in the Table, as peel strength/% cohesive failure.

TABLE

| Primer | Substrate I [N/mm]/[%] | Substrate II [N/mm]/[%] | Substrate III [N/mm]/[%] | Substrate IV [N/mm]/[%] | Substrate V [N/mm]/[%] | Substrate VI [N/mm]/[%] |
|---|---|---|---|---|---|---|
| 1 | — | — | — | — | — | 7.9/100 |
| 2 | 10.7/100 | 10.8/100 | 10.3/100 | 10.0/100 | 10.1/100 | 9.0/100 |
| 3 | 11.2/100 | 11.5/100 | 12.0/100 | 10.3/100 | 11.2/100 | 11.0/100 |
| 4 | —[1] | — | — | 9.2/100 | 8.9/100 | 9.4/100 |
| 5 | 9.2/100 | 9.0/100 | 9.4/100 | 9.8/100 | 9.8/100 | 10.1/100 |
| 6 | 10.1/100 | 9.4/100 | 11.4/100 | 10.6/100 | 8.0/80 | 11.4/100 |
| 7 | 11.0/100 | 9.9/100 | 9.7/100 | 11.1/100 | 10.9/100 | 12.2/100 |
| 8 (Comp.) | 7.8/50 | 4.5/30 | 3.0/0 | 6.7/50 | 5.0/50 | 4.5/50 |
| 9 (Comp.) | 4.2/30 | 3.8/30 | 4.0/30 | 8.2/80 | 4.0/30 | 3.0/30 |
| 10 (Comp.) | n.a.[2] | n.a. | n.a. | n.a. | n.a. | n.a. |

[1] not tested
[2] no adhesion

The values reported in the table demonstrate the high adhesive strength between the silicone elastomer and various organic plastics or metals with the use of the primer compositions according to the invention (primers 1 to 7). As can be seen from the comparative primers 8, 9 and 10, the lack of any one of the essential constituents of the primer compositions according to the invention leads to a substantially lower adhesive strength. Only if all constituents are present is a high adhesive strength achieved. This is evidence of an unexpected synergy of the constituents (A) to (C). By adding the constituents E or F or E and F, the adhesion can be further improved, as is evident from the examples.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A primer composition, comprising
(I) an organosilicon compound component consisting essentially of:
(A) 100 parts by weight of at least one organopolysiloxane comprising units of the formula

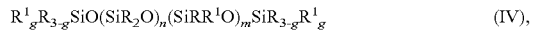  (IV), wherein
g is 0, 1, 2 or 3,
m is an integer from 20 to 200 and
n is an integer from 10 to 4,000,
in which
R each, independently, is a hydroxyl radical or a monovalent $C_{1-20}$ hydrocarbon radical which is optionally halogen-substituted or contains O, N, S or P atoms, and is free of aliphatically unsaturated groups,
$R^1$ each, independently, is a monovalent, aliphatically unsaturated $C_{1-10}$ hydrocarbon radical which is optionally halogen-substituted or contains O or N atoms;
(B) from 5 to 500 parts by weight of one or more organosilicon compounds having at least one hydrolyzable group, of the formulae

  (II) and

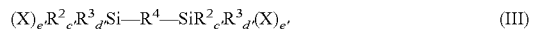  (III)

in which $R^2$ each, independently, is an optionally halogen-substituted monovalent $C_{1-20}$ hydrocarbon radical,
$R^3$ each, independently, is a monovalent radical selected from the group consisting of alkenyl radicals and Y—$R^4$ radicals,
X each, independently, is a hydrolyzable group selected from the group consisting of —$OR^2$, —$NR^2_2$, $R^2$—C(=O)—N($R^2$)— and —O—N=$CR^2_2$,
Y each, independently, is a monovalent radical selected from the group consisting of anhydride, aminoalkoxy, acryloyloxy, methacryloyloxy, N-aminoalkylamino, sulfone, sulfonate, phosphate, phosphonate, amino, N-alkylamino, epoxy and mercapto radicals,
$R^4$ each, independently, is a divalent $C_{1-20}$ hydrocarbon radical optionally containing O atoms,
c and d are each 0, 1, 2 or 3 and
e is 1, 2, 3 or 4,
with the proviso that the sum c+d+e=4;
c' and d' are each 0, 1 or 2 and
e' is 1, 2 or 3,
with the proviso that the sum c'+d'+e'=3; and
(II) further components
(C) from 5 to 500 parts by weight of reinforcing fillers;
(D) from 10 to 2000 parts by weight of solvent selected from the group consisting of organic solvents and low molecular weight cyclic or linear polyorganosilicon compounds, and mixtures thereof;
(E) from 0 to 80 parts by weight of at least one peroxidic crosslinking agent,
(F) from 0 to 50 parts by weight of one or more condensation catalysts, and
(G) from 0 to 50 parts by weight of one or more inactive fillers, pigments, dyes, heat stabilizers, alkynols, benzotriazoles, triazoles, fibers or plastics powders.

2. The primer composition of claim 1, wherein at least one of said peroxidic crosslinking agent is selected from the group consisting of dialkyl peroxide, diaryl peroxide, alkylaryl peroxide, aralkyl peroxide and hydrogen peroxide.

3. The primer composition of claim 1, wherein the organopolysiloxane (A) have a viscosity of from 0.001 Pa·s to 50,000 Pa·s at 25° C.

4. The primer composition of claim 1, wherein the reinforcing filler (C) has a BET surface area of at least 50 $m^2/g$ and is present in an amount of 15-60 parts by weight based on the weight of (A).

5. The primer composition of claim 1, wherein an organic solvent is present in an amount of 100 to 600 parts by weight based on the weight of (A).

6. The primer composition of claim 1, wherein $R^1$ in an organopolysiloxane (A) is a vinyl radical.

7. The primer composition of claim 1, wherein X in an organosilicon compound (B) is a radical of the formula —$OR^2$.

8. The primer composition of claim 1, wherein at least one of 3-(methacryloyloxy)propyltrimethoxysilane, 3-(methacryloyloxy)-propyltriethoxysilane, vinyltrimethoxysilane or vinyltriethoxysilane is employed as an organosilicon compound (B) of the formula (II).

9. The primer composition of claim 1, wherein at least one of 1,2-bis(trimethoxysilyl)ethane, 1,2-bis(triethoxysilyl)ethane, or a mixture thereof is employed as organosilicon compound (B) of the formula (III).

10. The primer composition of claim 1, wherein reinforcing fillers selected from the group consisting of the pyrogenic and precipitated silicas, optionally having been rendered water repellent, are used as at least one filler (C).

11. A process for the preparation of the primer composition of claim 1, wherein the constituents (A), (B), (C), (D) and, optionally, (E), (F) and (G) are mixed.

12. A process for improving the adhesion of silicone rubber to a substrate, comprising applying a primer composition of claim 1 to the substrate, allowing the primer composition to dry or crosslink in order to form a substrate covered with the primer, applying a crosslinkable silicone rubber composition to the substrate covered with the primer in order to obtain a composite, and curing the composite to obtain a composite comprising a silicone rubber adhered to said substrate.

13. The process of claim 12, wherein the substrate is an organic plastic, a metal, a glass, or a combination thereof.

14. The process of claim 12, wherein the substrate is a shaped article, a film or a coating.

15. The process of claim 12, wherein the crosslinkable silicone rubber composition is a peroxide-crosslinking or addition-crosslinking silicone rubber composition.

16. A shaped composite article or composite material produced by the process of claim 12.

17. An automotive component, household appliance component, or electronics industry component, comprising a composite prepared by the process of claim 12.

18. The primer composition of claim 1, which is free of peroxide crosslinking agent.

19. The primer composition of claim 18, which is free of condensation catalyst.

20. A primer composition, comprising
(I) an organosilicon compound component consisting of:
(A) 100 parts by weight of at least one organopolysiloxane comprising units of the formula

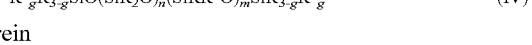

wherein
g is 0, 1, 2 or 3,
m is an integer from 20 to 200 and
n is an integer from 10 to 4,000.
in which
R each, independently, is a hydroxyl radical or a monovalent $C_{1-20}$ hydrocarbon radical which is optionally halogen-substituted or contains O, N, S or P atoms, and is free of aliphatically unsaturated groups,
$R^1$ each, independently, is a monovalent, aliphatically unsaturated $C_{1-10}$ hydrocarbon radical which is optionally halogen-substituted or contains O or N atoms;
(B) from 5 to 500 parts by weight of one or more organosilicon compounds having at least one hydrolyzable group, of the formulae

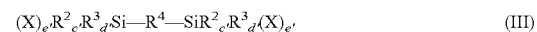

in which
$R^2$ each, independently, is an optionally halogen-substituted monovalent $C_{1-20}$ hydrocarbon radical,
$R^3$ each, independently, is a monovalent radical selected from the group consisting of alkenyl radicals and Y—$R^4$ radicals,
X each, independently, is a hydrolyzable group selected from the group consisting of —$OR^2$, —$NR^2_2$, $R^2$—C (=O)—N($R^2$)— and —O—N=$CR^2_2$,
Y each, independently, is a monovalent radical selected from the group consisting of anhydride, aminoalkoxy, acryloyloxy, methacryloyloxy, N-aminoalkylamino, sulfone, sulfonate, phosphate, phosphonate, amino, N-alkylamino, epoxy and mercapto radicals,
$R^4$ each, independently, is a divalent $C_{1-20}$ hydrocarbon radical optionally containing O atoms,
c and d are each 0, 1, 2 or 3 and
e is 1, 2, 3 or 4,
with the proviso that the sum c+d+e=4;
c' and d' are each 0, 1 or 2 and
e' is 1, 2 or 3,
with the proviso that the sum c'+d'+e'=3; and
(II) further components
(C) from 5 to 500 parts by weight of reinforcing fillers;
(D) from 10 to 2000 parts by weight of solvent selected from the group consisting of organic solvents and low molecular weight cyclic or linear polyorganosilicon compounds, and mixtures thereof;
(E) from 0 to 80 parts by weight of at least one peroxidic crosslinking agent,
(F) from 0 to 50 parts by weight of one or more condensation catalysts, and
(G) from 0 to 50 parts by weight of one or more inactive fillers, pigments, dyes, heat stabilizers, alkynols, benzotriazoles, triazoles, fibers or plastics powders.

* * * * *